United States Patent
Jang et al.

(10) Patent No.: US 8,519,941 B2
(45) Date of Patent: Aug. 27, 2013

(54) APPARATUS WITH HIGH-FREQUENCY DRIVING SIGNAL GENERATING UNIT FOR DRIVING BACKLIGHT UNIT

(75) Inventors: Yu Jin Jang, Gyunggi-do (KR); Jin Soo Lee, Gyeongsangbuk-do (KR); Mo Jeong Yang, Seoul (KR); In Jeong Cheon, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 577 days.

(21) Appl. No.: 12/771,002

(22) Filed: Apr. 30, 2010

(65) Prior Publication Data

US 2011/0141085 A1    Jun. 16, 2011

(30) Foreign Application Priority Data

Dec. 14, 2009 (KR) .................. 10-2009-0124119

(51) Int. Cl.
  *G09G 3/36* (2006.01)
(52) U.S. Cl.
  USPC .......................................... 345/102
(58) Field of Classification Search
  USPC .......................................... 345/102
  See application file for complete search history.

(56) References Cited

U.S. PATENT DOCUMENTS

| | | | |
|---|---|---|---|
| 4,280,208 A * | 7/1981 | Nomura | 368/66 |
| 6,100,677 A * | 8/2000 | Farrenkopf | 323/285 |
| 7,285,922 B2 * | 10/2007 | Gong et al. | 315/291 |
| 7,414,371 B1 | 8/2008 | Choi et al. | |
| 8,054,008 B2 * | 11/2011 | Kimura | 315/307 |
| 2003/0001552 A1 * | 1/2003 | Fujita et al. | 323/288 |
| 2005/0083282 A1 * | 4/2005 | Honbo | 345/87 |
| 2007/0132398 A1 * | 6/2007 | Ferguson et al. | 315/159 |
| 2009/0278466 A1 * | 11/2009 | Wang | 315/219 |
| 2011/0157943 A1 * | 6/2011 | Odell | 363/126 |

FOREIGN PATENT DOCUMENTS

KR     1020030054647 A    7/2003

* cited by examiner

*Primary Examiner* — Kwang-Su Yang
(74) *Attorney, Agent, or Firm* — Lowe, Hauptman & Ham

(57) ABSTRACT

An apparatus for driving a backlight unit including a lamp unit including a plurality of lamps includes an error amplifying unit configured to detect an error voltage between a feedback voltage corresponding to a current flowing to the lamp unit and a preset first reference voltage, a soft signal generation unit configured to generate a soft start signal of the lamp unit, a high-frequency signal driving signal generating unit configured to generate a high-frequency driving signal of the of the lamp unit, a high-frequency driving termination determining unit configured to generate a high-frequency driving termination signal when the error voltage is equal in voltage level to the soft start signal, and a high-frequency driving signal blocking unit configured to block the high-frequency driving signal in advance when the high-frequency driving termination signal is inputted.

5 Claims, 2 Drawing Sheets

APPARATUS WITH HIGH-FREQUENCY DRIVING SIGNAL GENERATING UNIT FOR DRIVING BACKLIGHT UNIT

CROSS-REFERENCE TO RELATED APPLICATIONS

This application claims the priority of Korean Patent Application No. 10-2009-0124119 filed on Dec. 14, 2009 in the Korean Intellectual Property Office, the disclosure of which is incorporated herein by reference.

BACKGROUND OF THE INVENTION

1. Field of the Invention

The present invention relates to an initial driving circuit of a backlight unit which is applicable to LCD monitors, TVs, and the like, and more particularly, to an initial driving circuit of a backlight unit which is capable of protecting the backlight unit by reducing an initial high-frequency driving time with the use of a feedback signal and a soft start signal.

2. Description of the Related Art

In general, a backlight inverter is used for liquid crystal display (LCD) TVs or LCD monitors employing a cold cathode fluorescent lamp (CCFL), and includes various protection circuits so as to protect internal devices.

Greater precision in the design of protection circuits is required in order to improve the quality of TVs and monitors. In order to initially drive a CCFL (hereinafter, referred to as a lamp), a protection circuit intensively lights up the lamp at a frequency higher than a normal frequency. Then, when the lamp is stabilized after the lapse of a predetermined time, the protection circuit reduces the frequency to the normal frequency.

Also, the protection circuit serves a role in protecting a transformer and an opened part of the lamp by causing the lamp to operate at a frequency higher than the normal frequency, even during abnormal operation of the lamp.

A related art backlight inverter should be driven at relatively high frequency during the initial driving operation, and should be driven at relatively low frequency during normal operation. However, an initial high-frequency driving time is determined on the basis of a voltage charged in a capacitor, and it is thus difficult to accurately determine the initial high-frequency driving time.

If a high-frequency driving time exceeds the initial driving time of the lamp, it is problematic, in that the lamp may be damaged due to an intensive driving signal.

SUMMARY OF THE INVENTION

An aspect of the present invention provides an initial driving circuit of a backlight unit which can protect the backlight unit by reducing an initial high-frequency driving time with the use of a feedback signal and a soft start signal.

According to an aspect of the present invention, there is provided an initial driving circuit of a backlight unit having a lamp unit provided with a plurality of lamps, the initial driving circuit including: an error amplifying unit detecting an error voltage between a feedback voltage corresponding to a current flowing to the lamp unit and a preset first reference voltage; a soft signal generating unit generating a soft start signal of the lamp unit; a high-frequency driving signal generating unit generating a high-frequency driving signal of the lamp unit; a high-frequency driving termination determining unit generating a high-frequency driving termination signal when the error voltage is equal in voltage level to the soft start signal; and a high-frequency driving signal blocking unit blocking the high-frequency driving signal in advance when the high-frequency driving termination signal is inputted.

Also, the initial driving circuit of the backlight unit may further include a logic OR unit performing a logic OR operation on an output signal of the high-frequency driving signal blocking unit and a protection signal to output a load control signal for controlling a driving current.

The error amplifying unit may include: a first error amplifier detecting an error voltage between a feedback voltage corresponding to a current flowing to the lamp unit and a preset first reference voltage; and a pull-up circuit providing a first power supply voltage for setting an output voltage of the first error amplifier to have a high level.

The soft signal generating unit may include: a first current source having one terminal connected to a terminal of a preset second power supply voltage; a first capacitor connected between the other terminal of the first current source and a ground; and a first Zener diode connected between the other terminal of the first current source and the ground.

The high-frequency driving signal generating unit may include: a second current source having one terminal connected to a terminal of a preset third power supply voltage; a switch switching a common terminal, which is connected to the other terminal of the second current source, between a ground terminal and a charged terminal; a second Zener diode connected between the other terminal of the second current source and a ground; and a first comparator comparing an output voltage of the switch with a preset second reference voltage to generate the high-frequency driving signal during a period when a voltage charged in the second capacitor is lower than the second reference voltage.

The high-frequency driving termination determining unit may be configured with a second comparator, the second comparator including: a non-inverting terminal receiving the error voltage; an inverting terminal receiving the soft start signal; and an output terminal outputting the high-frequency driving termination signal having a logic low level when the soft start signal is equal in voltage level to the error voltage.

The high-frequency driving signal blocking unit may be configured with a logic AND device, wherein the logic AND device performs a logic AND operation on the high-frequency driving termination signal of the high-frequency driving termination determining unit and the high-frequency driving signal of the high-frequency driving signal generating unit and outputs a low-level output signal of the high-frequency driving signal generating unit when the high-frequency driving termination signal has a logic low level.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
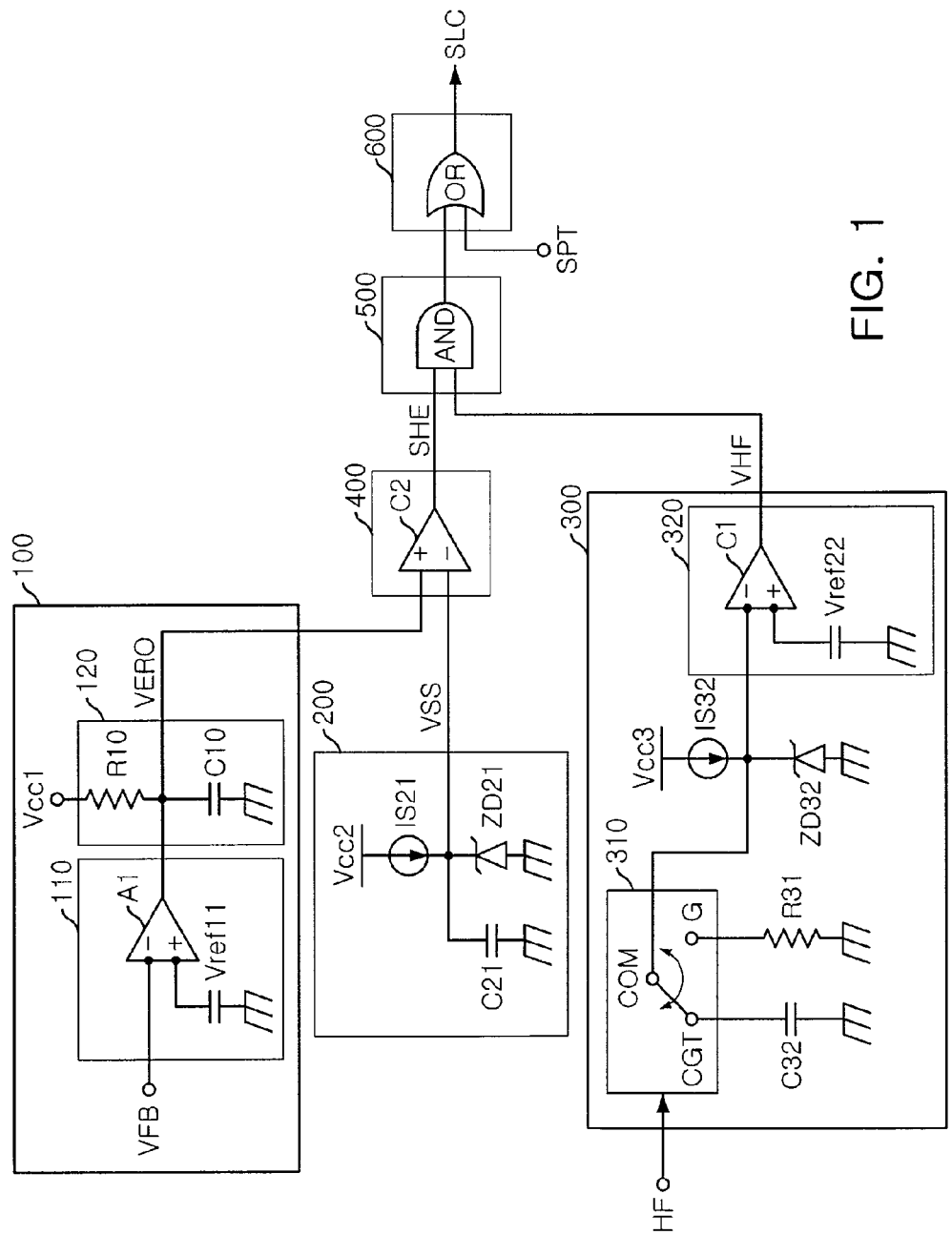
FIG. 1 is a block diagram illustrating an initial driving circuit of a backlight unit according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

FIG. 1 is a block diagram illustrating an initial driving circuit of a backlight unit according to an embodiment of the present invention.

Referring to FIG. 1, an initial driving circuit of a backlight unit according to an embodiment of the present invention having a lamp unit provided with a plurality of lamps includes an error amplifying unit 100, a soft signal generating unit 200, a high-frequency driving signal generating unit 300, a high-frequency driving termination determining unit 400, and a high-frequency driving signal blocking unit 500. The error amplifying unit 100 detects an error voltage VERO between a feedback voltage VFB corresponding to a current flowing to the lamp unit and a preset first reference voltage Vref11. The soft signal generation unit 200 generates a soft start signal VSS of the lamp unit. The high-frequency driving signal generating unit 300 generates a high-frequency driving signal VHF of the of the lamp unit. The high-frequency driving termination determining unit 400 generates a high-frequency driving termination signal SHE when the error voltage VERO is equal in voltage level to the soft start signal VSS. The high-frequency driving signal blocking unit 500 blocks the high-frequency driving signal VHF in advance when the high-frequency driving termination signal SHE is inputted.

Also, the initial driving circuit of the backlight unit according to an embodiment of the present invention may include a logic OR unit 600 performing a logic OR operation on an output signal of the high-frequency driving signal blocking unit 500 and a protection signal SPT, thereby outputting a load control signal SLC used for controlling a driving current.

The error amplifying unit 100 may include a first error amplifier 110 detecting the error voltage VERO between the feedback voltage VFB corresponding to the current flowing to the lamp unit and the preset first reference voltage Vref11, and a pull-up circuit 120 providing a first power supply voltage Vcc1 for setting the output voltage VERO of the first error amplifier 110 to have a high level.

For example, the pull-up circuit 120 may include a pull-up resistor R10 connected between a terminal of the first power supply voltage Vcc1 and an output terminal of the first error amplifier 110, and a capacitor C10 connected between the output terminal of the first error amplifier 110 and a ground.

The soft signal generating unit 200 may include a first current source IS21 having one terminal connected to a terminal of a preset second power supply voltage Vcc2, a first capacitor C21 connected between the other terminal of the first current source IS21 and the ground, and a first Zener diode ZD21 connected between the other terminal of the first current source IS21 and the ground.

The high-frequency driving signal generating unit 300 may include a second current source IS32 having one terminal connected to a terminal of a preset third power supply voltage Vcc3, a switch 310 switching a common terminal COM, which is connected to the other terminal of the second current source IS32, between a ground terminal G and a charged terminal CGT, a second Zener diode ZD32 connected between the other terminal of the second current source IS32 and the ground, a first comparator 320 comparing an output voltage of the switch 310 with a preset second reference voltage Vref22 to thereby generate the high-frequency driving signal VHF during a period when a voltage charged in the second capacitor C32 is lower than the second reference voltage Vref22.

Here, a resistor R31 may be connected between the ground terminal G and the ground.

The high-frequency driving termination determining unit 400 may be configured with a second comparator C2 that is provided with a non-inverting terminal receiving the error voltage VERO, an inverting terminal receiving the soft start signal VSS, and an output terminal outputting the high-frequency driving termination signal SHE having a logic low level when the soft start signal VSS is equal in voltage level to the error voltage VERO.

The high-frequency driving signal blocking unit 500 may be configured with a logic AND device that performs a logic AND operation on the high-frequency driving termination signal SHE of the high-frequency driving termination determining unit 400 and the high-frequency driving signal VHF of the high-frequency driving signal generating unit 300 and outputs a low-level output signal of the high-frequency driving signal generating unit 300 when the high-frequency driving termination signal SHE has a logic low level.

Figure 2:
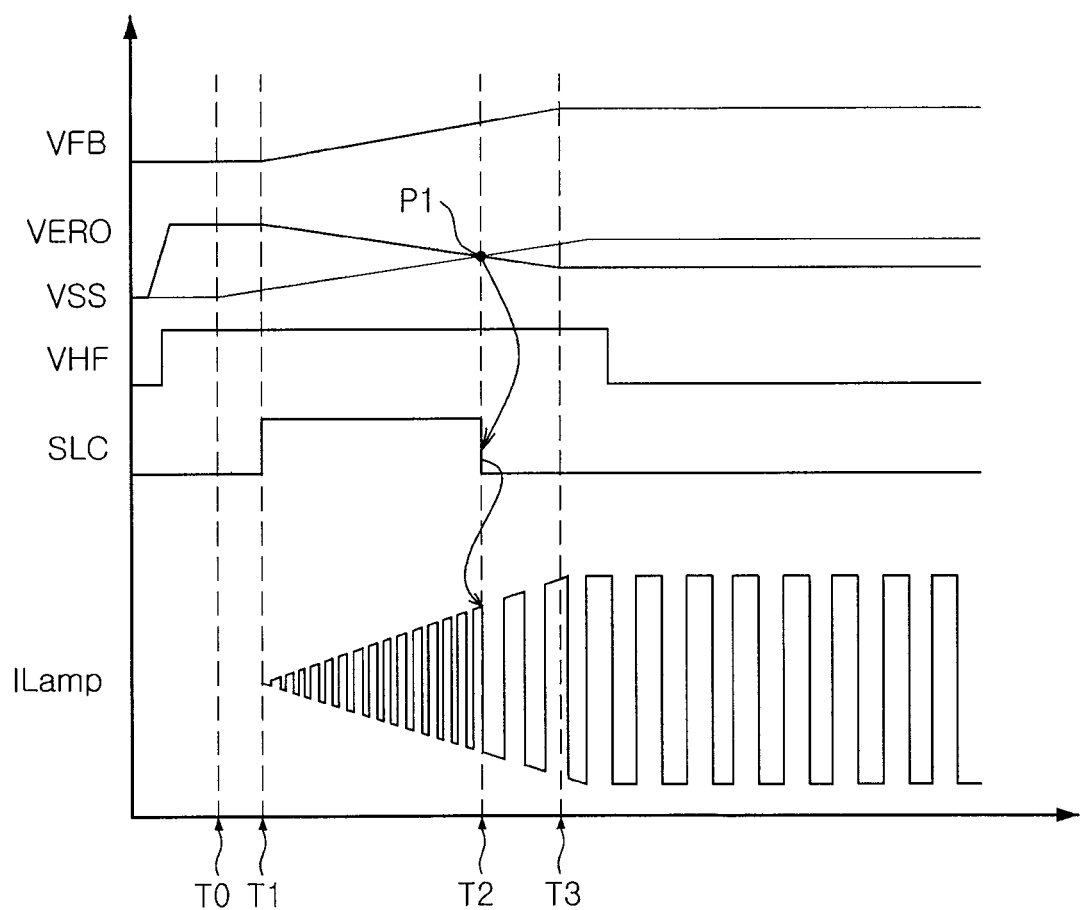
FIG. 2 is a timing chart illustrating main signals used in the present invention.

FIG. 2 is a timing chart illustrating main signals used in the present invention. In FIG. 2, the reference symbol VFB denotes a feedback voltage corresponding to a current flowing to the lamp unit of the backlight unit.

The error voltage VERO is outputted from the error amplifying unit 100, and corresponds to a voltage difference between the high-frequency driving signal VHF and the preset first reference voltage Vref11. The soft start signal VSS is outputted from the soft signal generating unit 200, and allows a voltage level to gradually increase during a soft start period.

The high-frequency driving signal VHF is outputted from the high-frequency driving signal generating unit 300, and is generated while a preset initial high-frequency period signal HF is being maintained at low high level.

Reference symbols T0, T1 and T2 respectively denote a driving initiation timing, a timing when a current starts flowing to the lamp unit, and a timing when a high-frequency driving is terminated according to an embodiment of the present invention. Reference symbol T3 is a soft start termination timing.

Hereinafter, functions and effects of the driving circuit of the backlight unit according to an embodiment of the present invention will be described in detail with reference to the accompanying drawings.

As illustrated in FIGS. 1 and 2, the driving circuit of the backlight unit according to an embodiment of the present invention is a circuit for initially driving the backlight unit including a lamp unit provided with a plurality of lamps.

Referring to FIGS. 1 and 2, the error amplifying unit 100 of the initial driving circuit of the backlight unit according to an embodiment of the present invention detects the error voltage VERO between the feedback voltage VFB corresponding to the current flowing to the lamp unit and the preset first reference voltage Vref11. Here, the error voltage VERO is a voltage difference between the feedback voltage VFB and the preset first reference voltage Vref11.

As a specific exemplary embodiment, when the error amplifying unit 100 is configured with the first error amplifier 110 and the pull-up circuit 120, the first error amplifier 110 detects the error voltage VERO between the feedback voltage VFB corresponding to the current flowing to the lamp unit and the preset first reference voltage Vref11.

The pull-up circuit 120 sets the output voltage VERO of the first error amplifier 110 to have a high level, and pulls up a level of the error voltage VERO output from the first error amplifier 110 up to a first operating voltage Vcc maximally.

Referring to FIG. 2, the feedback voltage VFB is a voltage gradually increasing from the initial driving timing, the first reference voltage Vref11 is a constant voltage, and the error voltage VERO is a voltage obtained by subtracting the feedback voltage VFB from the first reference voltage Vref11. Therefore, the error voltage VERO gradually decreases from the first reference voltage (e.g., 5 V) during the initial driving stage.

Also, the soft signal generating unit 200 of the present invention generates the soft start signal VSS of the lamp unit.

As a specific exemplary embodiment, when the lamp unit starts being driven, a current generated from the first current source IS21 of the soft signal generating unit 200 charges the first capacitor C21 so that the charged voltage of the first capacitor C21 progressively increases up to a breakdown voltage of the first Zener diode ZD21 according to a current level of the first current source IS21. The charged voltage of the first capacitor C21 is applied to the high-frequency driving termination determining unit 400 as the soft start signal VSS.

In this way, since the soft start signal VSS gradually increases and the error voltage VERO gradually decreases, the soft start signal VSS and the error voltage VERO have the same voltage level before the soft start period is terminated.

Thereafter, the high-frequency driving signal generating unit 300 of the present invention may generate the high-frequency driving signal VHF of the lamp unit.

As a specific exemplary embodiment, when the lamp unit starts being driven, the switch 310 of the high-frequency driving signal generating unit 300 connects the second capacitor C32 connected to the charged terminal CGT to the second current source IS32.

Thus, the second capacitor C32 is charged by the current generated in the second current source IS32, and the voltage charged in the second capacitor C32 gradually increases up to the breakdown voltage of the second Zener diode ZD32 according to a level of the current generated by the second current source IS32.

Subsequently, the first comparator 320 (C1) of the high-frequency driving signal generating unit 300 compares the output voltage of the switch 310 with the preset second reference voltage Vref22 to thereby generate the high-frequency driving signal VHF having a logic high level when the charged voltage of the second capacitor C32 is lower than the second reference voltage Vref22.

The high-frequency driving termination determining unit 400 of the present invention may generate the high-frequency driving termination signal SHE when the error voltage VERO is equal in voltage level to the soft start signal VSS.

For example, when the high-frequency driving termination determining unit 400 is configured with the second comparator C2, as illustrated in FIG. 1, the second comparator C2 outputs the high-frequency driving termination signal SHE having a logic high level when the soft start signal VSS is lower in voltage level than the error voltage VERO, and outputs the high-frequency driving termination signal SHE having a logic low level when a voltage level of the soft start signal VSS is equal to or higher than that of the error voltage VERO.

Thereafter, the high-frequency driving signal blocking unit 500 of the present invention may block the high-frequency driving signal VHF in advance when the high-frequency driving termination signal SHE is inputted.

For instance, when the high-frequency driving signal blocking unit 500 is configured with a logic AND device, the high-frequency driving signal blocking unit 500 performs a logic AND operation on the high-frequency driving termination signal SHE of the high-frequency driving termination determining unit 400 and the high-frequency driving signal VHF of the high-frequency driving signal generating unit 300 and outputs a low-level output signal of the high-frequency driving signal generating unit 300 when the high-frequency driving termination signal SHE has a logic low level.

The logic OR unit 600 performs a logic OR operation on an output signal of the high-frequency driving signal blocking unit 500 and a protection signal SPT to thereby output a load control signal SLC used for controlling a driving current.

Referring to FIG. 2, as shown in a waveform diagram of the current ILamp flowing to the lamp unit of the backlight unit, high-frequency driving is terminated prior to the soft start termination timing T3 in response to the load control signal SLC, thus making it possible to prevent the damage of the lamp unit of the backlight unit which may be caused by a long-time high-frequency driving.

According to an embodiment of the present invention, the use of a feedback signal and a soft start signal makes it possible to protect a backlight unit by reducing an initial high-frequency driving time.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for driving a backlight unit comprising a lamp unit including a plurality of lamps, the apparatus comprising:

an error amplifying unit configured to detect an error voltage between a feedback voltage corresponding to a current flowing to the lamp unit and a preset first reference voltage;

a soft signal generating unit configured to generate a soft start signal of the lamp unit;

a high-frequency driving signal generating unit configured to generate a high-frequency driving signal of the lamp unit;

a high-frequency driving termination determining unit configured to generate a high-frequency driving termination signal when the error voltage is equal in voltage level to the soft start signal; and a high-frequency driving signal blocking unit configured to block the high-frequency driving signal in advance when the high-frequency driving termination signal is inputted, wherein the soft signal generating unit comprises:
a first current source having one terminal connected to a terminal of a preset first power supply voltage;
a first capacitor connected between the other terminal of the first current source and a ground; and
a first Zener diode connected between the other terminal of the first current source and the ground in parallel to the first capacitor, and the high-frequency driving signal generating unit comprises:
a second current source having one terminal connected to a terminal of a preset second power supply voltage;
a switch configured to switch a common terminal, which is connected to the other terminal of the second current source, between a ground terminal and a charged terminal;
a second capacitor connected to the charged terminal;

a second Zener diode connected between the other terminal of the second current source and the ground; and a first comparator configured to compare an output voltage of the switch with a preset second reference voltage to generate the high-frequency driving signal during a period when a voltage charged in the second capacitor is lower than the second reference voltage.

2. The apparatus of claim 1, further comprising:
a logic OR unit configured to perform a logic OR operation on an output signal of the high-frequency driving signal blocking unit and a protection signal to output a load control signal for controlling a driving current.

3. The apparatus of claim 1, wherein the error amplifying unit comprises:
a first error amplifier configured to detect an error voltage between a feedback voltage corresponding to the current flowing to the lamp unit and the preset first reference voltage; and
a pull-up circuit configured to provide a third power supply voltage for setting an output voltage of the first error amplifier to have a high level.

4. The apparatus of claim 1, wherein the high-frequency driving termination determining unit includes a second comparator, the second comparator comprising:
a non-inverting terminal configured to receive the error voltage;
an inverting terminal configured to receive the soft start signal; and
an output terminal configured to output the high-frequency driving termination signal having a logic low level when the soft start signal is equal in voltage level to the error voltage.

5. The apparatus of claim 4, wherein the high-frequency driving signal blocking unit includes a logic AND device configured to perform a logic AND operation on the high-frequency driving termination signal of the high-frequency driving termination determining unit and the high-frequency driving signal of the high-frequency driving signal generating unit and to output a low-level output signal of the high-frequency driving signal generating unit when the high-frequency driving termination signal has a logic low level.

* * * * *